W. H. MOORE.
TIRE COVER.
APPLICATION FILED MAR. 25, 1920.
1,389,838.
Patented Sept. 6, 1921.
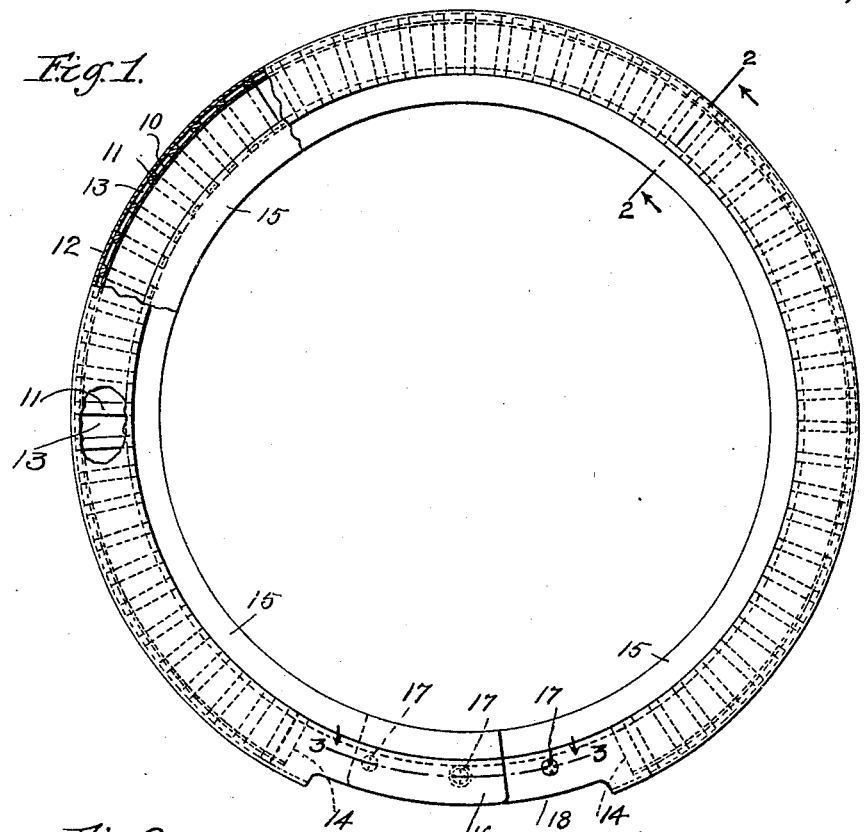
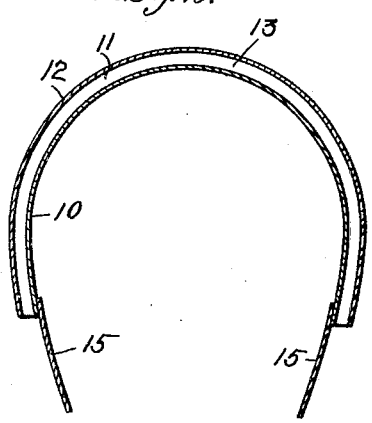
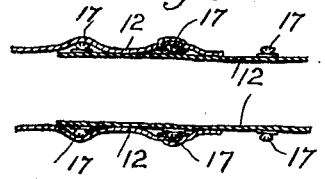
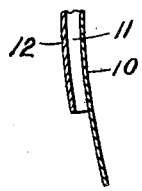
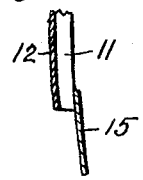
INVENTOR
William H. Moore
BY
Edmund A. Strauss
ATTORNEY

UNITED STATES PATENT OFFICE.

WILLIAM H. MOORE, OF PASADENA, CALIFORNIA.

TIRE-COVER.

1,389,838.  Specification of Letters Patent.  Patented Sept. 6, 1921.

Application filed March 25, 1920. Serial No. 368,545.

*To all whom it may concern:*

Be it known that I, WILLIAM H. MOORE, a citizen of the United States, residing at Pasadena, in the county of Los Angeles and State of California, have invented new and useful Improvements in Tire-Covers, of which the following is a specification.

My invention relates to tire covers and is especially adapted to be used for conveniently covering pneumatic tires when either on or off a vehicle wheel to protect the same from the elements.

The object of my invention is to provide a simple, durable and efficient cover for pneumatic tires, which may be quickly adjusted and secured to a tire when in use on the vehicle wheel, or when out of use and supported in an exposed position on the vehicle, whereby said tire will be protected from the deteriorating effects of the sun and other elements.

Another object of my invention is to provide a tire cover which will permit of a free circulation of atmospheric air between said cover and the tire.

A further object of my invention is to provide a cover which may be readily adjusted to tires of different diameters.

Other objects will appear in the following description, will be pointed out in the appended claims and will be embodied in the accompanying drawings, in which:

Figure 1 is a side elevation of my tire cover, parts being broken away and shown in section in order to more clearly illustrate the detail of construction.

Fig. 2 is an enlarged cross section through the cover, taken on the line 2—2 of Fig. 1.

Fig. 3 is a section taken on the line 3—3 of Fig. 1 illustrating the method of fastening the cover to the tire.

Fig. 4 is a fragmental cross sectional view illustrating a modified form of cover.

Fig. 5 is a fragmental cross sectional view illustrating another modified form of my invention.

In carrying out my invention, I provide a lining 10 made of canvas or any other suitable material which is semi-circular in cross section and adapted to fit over the tread and sides of a pneumatic tire. The lining 10 is provided with a plurality of semi-circular ribs 11 which are secured thereto and formed of felt or any other desired material and are spaced suitably apart as clearly shown in Fig. 1. An outer casing or covering 12 is secured to the ribs 11, thus forming a plurality of semi-circular chambers or grooves 13 through which atmospheric air may circulate. The outer covering 12 is preferably formed of opaque or black material and may be waterproofed if so desired in order that the rays of the sun will not penetrate into the chambers 13.

The ribs 11 and lining 10 extend only partially around the circumference of the tire, they being stopped at the points 14 adjacent the portion thereof, which rests upon the ground. Extension flaps 15 are secured to the lining 10 and extend inwardly beyond the ribs 11, and said flaps are secured to the outer casing at the space between points 14, the outer casing and flaps at this point being arranged so as to overlap as at 16, and are provided with suitable snap fastening devices 17. By this arrangement it will be obvious that the cover may be placed over the tire when resting on the ground and secured in position by means of the fastening devices 17, and said fastening devices may be so arranged that the cover may be caused to fit snugly over tires of different diameters, and in order that it may not be necessary to move the tire when resting upon the ground, in order to place the cover therearound, the portion of the outer casing 12 adjacent the ground is cut away as at 18.

It is obvious that the extension flaps 15 shown in Figs. 1 and 2 may be a continuation of the lining 10 as shown in Fig. 4, but in the manufacture of the cover I have found it desirable to form the main portion of the lining 10 of a light colored porous material in order that a portion of the air circulating through the chambers 13 may reach the tire to prevent sweating of the same. It is also obvious that the lining 10 may be entirely omitted as shown in Fig. 5, and the flaps 15 secured to the ribs. By this construction the ribs 11 will rest directly upon the tire and the air circulating chambers 13 formed between the tire and the outer casing 12.

The outer casing 12 and ribs 11 in cross section extend only partially around the tire, in order that the ends of said ribs and the chambers 13 will not be exposed to view when looking at the side of the cover as well as to economize in material, thus giving the entire cover a neat and trim appearance.

By the above recited construction it will be apparent that I have provided a cover which will effectually shield the tire from the rays of the sun when in use and which will at the same time permit of a free circulation of air around the tire, thus greatly prolonging the life of the tire, and I have also provided a cover which will accommodate itself to tires of different dimensions and which may be readily adjusted to a tire when resting upon the ground.

What I claim is:

1. A tire cover comprising an annular casing substantially semi-circular in cross section provided with a plurality of air chambers open to the atmosphere.

2. A tire cover comprising an annular casing substantially semi-circular in cross section provided with a plurality of ribs on its inner surface adapted to rest adjacent a tire to form air circulating chambers therebetween.

3. A tire cover comprising an annular casing substantially semi-circular in cross section, an inner lining also semi-circular in cross section, and a plurality of ribs interposed therebetween adapted to form air chambers open to the atmosphere.

4. A tire cover comprising an annular casing substantially semi-circular in cross section provided with a plurality of air chambers open to the atmosphere, said casing having overlapping ends, and means for adjustably securing said overlapping ends together.

5. A tire cover comprising an annular casing substantially semi-circular in cross section, an inner lining also semi-circular in cross section spaced apart to form an air circulating passage therebetween, and extension flaps secured to said inner lining.

In witness that I claim the foregoing I have hereunto subscribed my name this 4th day of March, 1920.

WILLIAM H. MOORE.